Nov. 14, 1967  D. W. ROCKWELL  3,353,151
COMMON TANGENT STACKING METHOD AND SYSTEM FOR LOCATING SONIC
ENERGY VELOCITY DISCONTINUITIES
Filed Sept. 30, 1964  6 Sheets-Sheet 1

Nov. 14, 1967    D. W. ROCKWELL    3,353,151
COMMON TANGENT STACKING METHOD AND SYSTEM FOR LOCATING SONIC
ENERGY VELOCITY DISCONTINUITIES
Filed Sept. 30, 1964    6 Sheets-Sheet 2

INVENTOR
Don W. Rockwell

INVENTOR
Don W. Rockwell

ATTORNEY

Nov. 14, 1967 D. W. ROCKWELL 3,353,151
COMMON TANGENT STACKING METHOD AND SYSTEM FOR LOCATING SONIC
ENERGY VELOCITY DISCONTINUITIES
Filed Sept. 30, 1964 6 Sheets-Sheet 5

INVENTOR
Don W. Rockwell

E. Mickey Hubbard
ATTORNEY

United States Patent Office 3,353,151
Patented Nov. 14, 1967

3,353,151
COMMON TANGENT STACKING METHOD AND SYSTEM FOR LOCATING SONIC ENERGY VELOCITY DISCONTINUITIES
Don W. Rockwell, London, England, assignor to Texas Instruments Incorporated, Dallas, Tex., a corporation of Delaware
Filed Sept. 30, 1964, Ser. No. 400,369
50 Claims. (Cl. 340—15.5)

The present invention relates to geophysics, and more specifically relates to an improved method and system for processing seismic response data to locate reflecting interfaces in true migrated position while enhancing the data.

In geophysical prospecting, seismic energy is induced in the earth, either by means of an explosion or by means of some mechanical impacting or vibration means at some point near the surface. The energy propagates downwardly through the earth as a wave-front. When the energy passes from a zone having one acoustic velocity to a zone of different velocity, a portion of the energy is reflected back to the surface where it is detected by an array of nests of geophones and recorded with respect to time. Due to random differences in the acoustic velocity characteristics of various strata, the seismic response data is a randomly-varying signal having certain characteristic wave shapes which are referred to in the art as events and which are usually indicative of the presence of an interface.

The surface of the earth is usually uneven and the seismic response from a single energy pulse is usually detected at several remote points simultaneously. Accordingly, the response traces must be corrected in such a manner as to be representative of the response at a point on a datum plane from energy induced at that point so that the normal distance to any reflecting interface is expressed by elapsed time to the event in the response data. Since the response signals are recorded with respect to time, it has heretofore been necessary to convert the data to a distance scale before the positions of the interfaces can be plotted. This conversion is complicated by the fact that the velocity of seismic energy varies with depth, due to changes in the densities and characteristics of the formations. Since the seismic energy detected does not necessarily travel in a vertical path, but instead is reflected from an interface at an angle equal to the angle of incidence, the distance to the reflecting interface is not necessarily the vertical depth of the interface, but is the shortest distance (i.e., normal distance) to the interface. Thus the response data from two spaced points is necessary in order to determine the angle of inclination or dip of a bed relative to a vertical plane passing through the two points. Seismic data from a third point not lying in the plane is required to determine the actual dip and directional dip.

This problem of determining dip is also complicated by the fact that the seismic energy travels in a curved path both to and from a dipping interface as a result of the change in velocity of the energy with depth. Heretofore the curved path has been approximated by a straight line if the change in velocity was not great, or by a series of straight lines. These procedures are fairly accurate in certain cases but are slow and tedious even when using various plotting machines which have been devised for this purpose. But in cases where the seismic velocity varies at a high rate, or nonuniformly, these procedures become even more complex and slow, and are of questionable accuracy. Further, these procedures require that the seismic response data be interpreted prior to plotting which tends to induce human error in addition to the error resulting from the approximations. Some techniques have been developed for compositing a number of response traces, but this compositing is accomplished only in the time mode without regard to the true or migrated position from which the reflections originate.

Therefore an important object of the present invention is to provide an improved method and system for processing and interpreting seismic reflection data.

Another object of the invention is to provide a system for automatically migrating seismic response data so as to eliminate all hand plotting and interpretation.

Yet another object is to provide a method and system for migrating all response data rather than merely selected portions of the data.

A further object of the invention is to provide a method for processing seismic response data from areas where the velocity of seismic energy changes in any manner with respect to depth.

Another object of the invention is to more accurately determine the true dip and location of reflection interfaces.

Yet another object of the invention is to enhance the seismic reflection data by compositing the data in the migrated mode.

A furtrer object of the invention is to provide a system of the type described which may be operated in real time.

Another object of the invention is to provide such a system of the type described in which the basic components are commercially available.

Another object of the invention is to provide a system of the type described which may be operated at speed faster than real time.

In accordance with this invention, the seismic response data is recorded at a plurality of spaced points and the data from each point is corrected for surface irregularities and step-out to produce seismograms representative of energy originating at and returning to points on a common datum plane. Each of the seismograms is then converted to data representative of a scaled wave-front pattern in terms of distance in which each point in the pattern has a value representative of the value of the seismogram at the corresponding point in elapsed time. The sets of data representative of the wave-front patterns are then combined to produce composite data representative of the sum of the wave-front patterns if the wave-front patterns were disposed in the appropriate scale positions along a datum line. When plotted, the composite data produces reinforcement patterns lying generally along tangent lines common to the wave-fronts of the several superimposed patterns.

In cases where the velocity of the seismic energy is essentially constant, the scaled wave-front patterns may be concentric arcs with each one having an intensity or value corresponding to the value of the response data at the point in time. However, a more general requirement is that the scaled wave-front patterns be essentially a series of nonconcentric arcs, each having a center at a point H vertically below the datum point and a radius R where $$H = \frac{V_d}{a}\left(\cosh \frac{at}{2} - 1\right) \quad (1)$$

and $$R = \frac{V_d}{a}\left(\sinh \frac{at}{2}\right) \quad (2)$$

wherein $V_d$ is the velocity $a$ at the datum point, $a$ is the acceleration of the seismic energy and $t$ is the two-way travel time. The acceleration value $a$ may be a constant or may be any function of travel time so that the rate of change of both H and R may vary with depth.

The summation of the corresponding points of the wave-front patterns is preferably algebraic so that negative values will be subtracted from positive values, but may be merely additive wherein the negative values are relatively low values and the positive values relatively high values. The data representative of the scaled wavefront patterns may be combined by successively recording the sets of data in scale position on a common record surface such that the corresponding portions will overlap and be summed. The record medium may be a photographic medium, in which case the patterns would merely be added, not algebraically. Or a magnetic or electrostatic record medium may be used, in which case the summation may, to some degree, be algebraic. Or the data representative of each of the scalar wave-front patterns may be recorded on separate record surfaces, the corresponding portions of the patterns simultaneously scanned to produce signals representative of the scanned values of the patterns, and the signals summed, algebraically if desired, to produce the combined data.

In accordance with another aspect of the invention, the data representative of each scaled wave-front pattern is produced by scanning a recording transducer through arcuate paths of increasing radius across a record surface while recording the seismic response data on the record sheet. The radius of the arcuate path is varied at a rate determined by the instantaneous velocity of the seismic energy and the apparent center of the arcuate path is moved as a function of the acceleration of the seismic energy.

In accordance with a preferred embodiment of the invention, the scanning transducer is the electron beam of a cathode ray tube which is modulated in accordance with the seismic response data being converted to the scaled wave-front pattern data. Successive scaled wavefront patterns may be photographically recorded in scale positions on a common film as multiple exposures to accomplish the necessary summation. The electron beam of the cathode ray tube is scanned through successive arcuate paths to represent the expanding wave-front. The radius of the arc increases at a rate related to the instantaneous velocity of the seismic energy as expressed in Equation 2 above, and the apparent centers of the arcuated paths descend at a rate related to the change in velocity $a$ as indicated by Equation 1. By both lowering the apparent center of the wave-front and changing the rate at which the wave-front propagates, the actual path of the seismic energy through the earth may be reproduced with an accuracy dependent upon the accuracy of the velocity information available. The true positions of the reflecting interfaces are then located somewhere on the arcuate wave-fronts, and the actual positions are determined by the reinforcements from the preceding and succeeding patterns along common tangent lines.

In accordance with other specific aspects of the invention, the scanning transducer may be a magnetic recording head and the record surface a magnetic record sheet. Or the scanning transducer may be a source of photographic energy which may be modulated in accordance with the seismic response data, and the recording surface a photographic film.

Additional objects and advantages of the invention will be evident to those skilled in the art from the following detailed description and the accompanying drawings, wherein.

Figure 1:
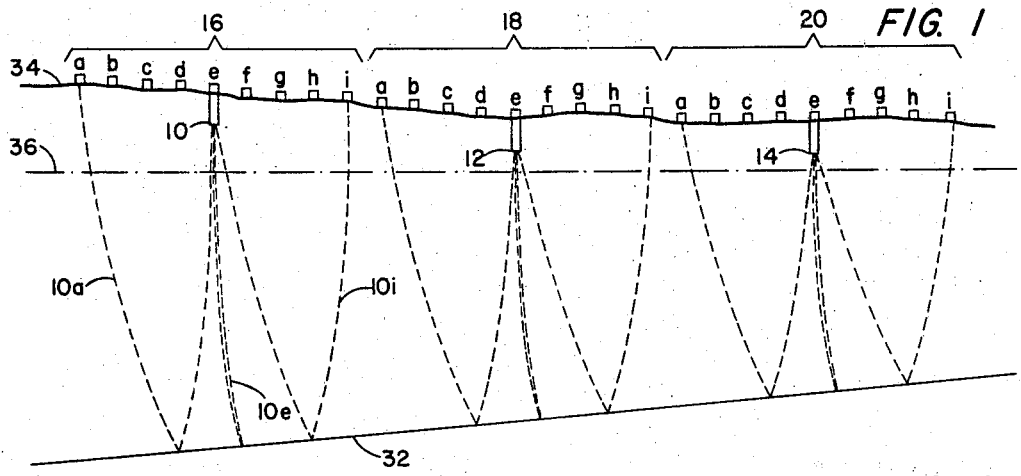
FIGURE 1 is a schematic vertical section through the earth illustrating generally the manner in which seismic reflection data may be obtained.
Figure 2:
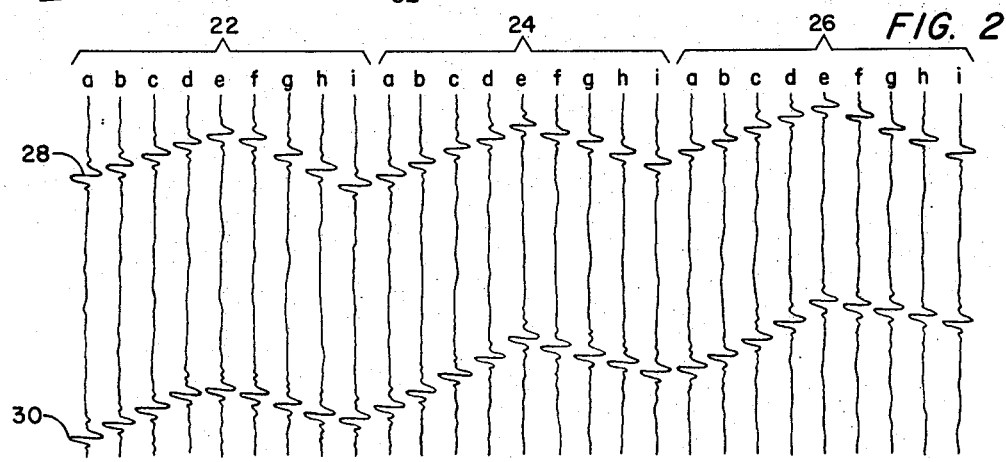
FIGURE 2 is a schematic illustration of a plurality of idealized seismic traces which might have been recorded by the geophones illustrated in FIGURE 1.
Figure 3:
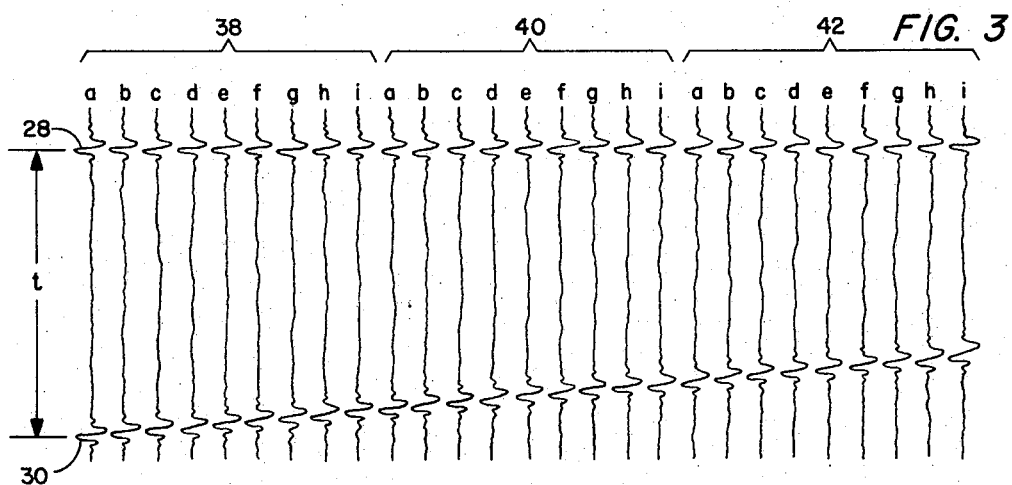
FIGURE 3 is a schematic illustration of the seismic reflection traces of FIGURE 2 as they might appear after being corrected for step-out and to a common datum plane.

Referring now to the drawings, FIGURE 1 schematically illustrates a vertical section taken through a line of successive seismic shot points 10, 12 and 14. Arrays of geophones $16a$–$16i$, $18a$–$18i$, and $20a$–$20i$ are associated with the shot points 10, 12 and 14, respectively. Upon generation of an impulse of seismic energy by means of an explosive or other source, sets of seismic response data represented by the idealized traces $22a$–$22i$ are received by the geophones $16a$–$16i$, respectively. Similarly a seismic impulse at shot point 12 results in seismic response data represented by traces $24a$–$24i$ being received by geophones $18a$–$18i$, and an impulse at shot point 14 produces the seismic response represented by the traces $26a$–$26i$ at geophones $20a$–$20i$. The seismic response data received by the geophones is customarily recorded with respect to elapsed time on a magnetic drum or tape, and is photographically reproduced only when visual inspection is required. In this invention, visual inspection is required only to the extent necessary for correction of the seismic data for step-out, i.e., normal move out, and for correction to a common datum plane. The initial event 28 of each trace is produced by seismic energy traveling in the most direct path to the geophones. Thus it will be noted that the initial or zero time event 28 for the outer traces $a$ and $i$ of each set occurs later than the event 28 of the center trace $e$. The events 30 which might be reflected from an interface 32 also exhibit some time differences due to the longer curved travel paths $10a$ and $10i$, for example, but this effect is reduced with depth. A portion of the difference in travel time is produced by variations in the contour of the surface 34 on which the geophones 16, 18 and 20 are disposed. Therefore, before the seismic data represented by the seismic response traces 22, 24 and 26 is used in accordance with the present invention, the response data is preferably corrected to a common datum line 36, and is also corrected to compensate for the step-out in the conventional and well-known manner so as to compensate for the difference in the length of the near-time reflection path $10e$, for example, and the remote reflection paths $10a$ and $10i$. After the sets of seismic response data, represented by the traces $22a$–$22i$, $24a$–$24i$ and $26a$–$26i$, have been corrected to a common datum plane and for step-out, but not for dip, the corrected seismic response data might be represented by idealized seismic traces 38a–38i, 40a–40i and 42a–42i in FIGURE 3.

Figure 5:
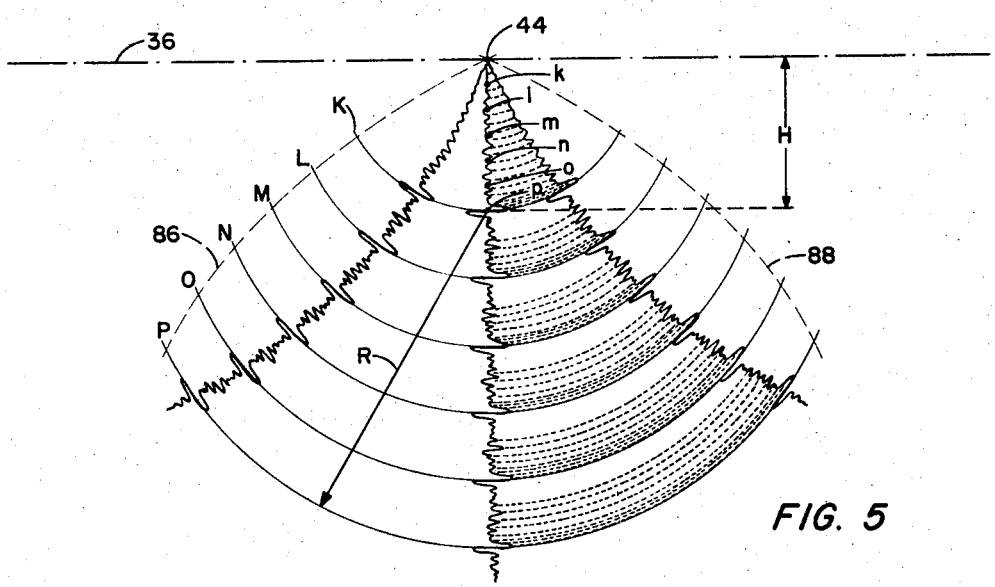
FIGURE 5 is a schematic drawing illustrating a wavefront pattern produced in accordance with the present invention.

Each of the sets of corrected data represented by the seismic response traces 38, 40 and 42 is next converted to data representative of a scaled wave-front pattern such as illustrated in FIGURE 5. If desired, only the near-time traces 38e, 40e and 42e may be converted. However, as will hereafter become more evident, it will usually be desirable to use all of the traces in order to obtain maximum sampling density of the overlapping wavefront patterns. Each scaled wave-front pattern is plotted from response data represented by a single trace. Starting at a center 44 on the datum plane 36, each discrete amplitude value of the seismic response data is converted to data representative of an arcuate wave-front having a density or magnitude representative of the discrete amplitude value, and a scale position and shape representative of all possible positions, i.e., the locii, of the actual geological structure causing the seismic reflection. The position and shape of the scaled wave-front will be the actual depth expressed as a function of the velocity and the travel time. The velocity V at a depth z may be represented by the equation $$V_z = V_d + \frac{a_z t_z}{2} \qquad (3)$$

wherein $V_d$ is the velocity at the datum line and $a_z$ is the acceleration of the seismic energy and $t_z$ is the two-way travel time. The acceleration may be other than a constant and may also be expressed as a function of time if suitable velocity data is available. In accordance with an important aspect of the invention, the arcuate wave-front has a radius R, as represented by Equation 2 above, which is centered a distance H, as represented by Equation 1 above, from the datum plane. The velocity data may be gained by the best available means, such as by logging a well bore in the same geological region or by another suitable approximation. Thus the events K–P of the reflection trace illustrated in FIGURE 5 might be arcuate wave-fronts having centers k–p, respectively. The data representative of the scaled wave-front pattern may be either analog or digital in nature as will hereafter become more apparent. It will be noted that the amplitude value at each coordinate point on the scaled wave front pattern is equal to the value of the response data at the elapsed time on the response data equal to the travel time from the source point to the coordinate point and back to the recording point.

Figure 4:
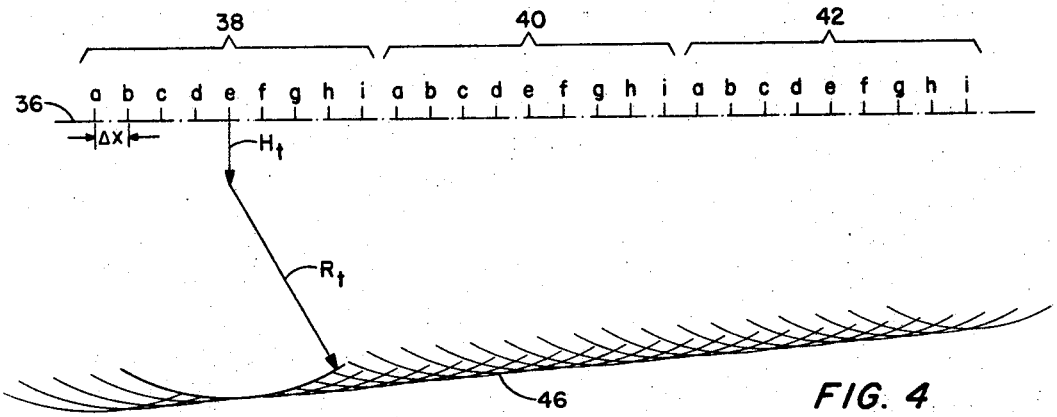
FIGURE 4 is a schematic drawing which serves to illustrate a basic concept of the present invention.

The sets of data representative of the wave-front patterns are then combined to produce data representative of the sum of the scaled wave-front patterns if the patterns were disposed in the relative scale positions representative of the relative positions of the respective source and recording points. That is, the spacing between the adjacent wave-front patterns is proportional to the horizontal distance between the geophones which detected the original response data. Summation of the corresponding values, i.e., the values occupying the same coordinate position on a common scaled grid system, produces reinforcement patterns generally along the common tangent lines of wave-fronts having common amplitude values, such as illustrated at 46 in FIGURE 4, which will be representative of the reflecting interface 32, for example. As previously mentioned, the summation of the scaled wavefront patterns when in scale position may be either algebraic or a simple summation in order to produce the reinforcement patterns which are representative of the reflecting interfaces. It will be noted that all of the seismic response data is utilized. Further, the data is migrated prior to interpretation so as to eliminate the human error in picking the events. The combination of the data representative of the wave-front patterns, particularly when using algebraic summation, tends to enhance the resolution of the response signal as a result of compositing, and the compositing is accomplished in the migrated mode, i.e., the signals reinforce other signals originating at the same point in space. It is important to note that the seismic response data is recorded with respect to travel time and has not been converted to data recorded with respect to depth. However, each increment of the response data is converted to a wave-front on a distance or depth scale so that the scaled wave-front pattern is in terms of distance, not travel time.

Figure 6:
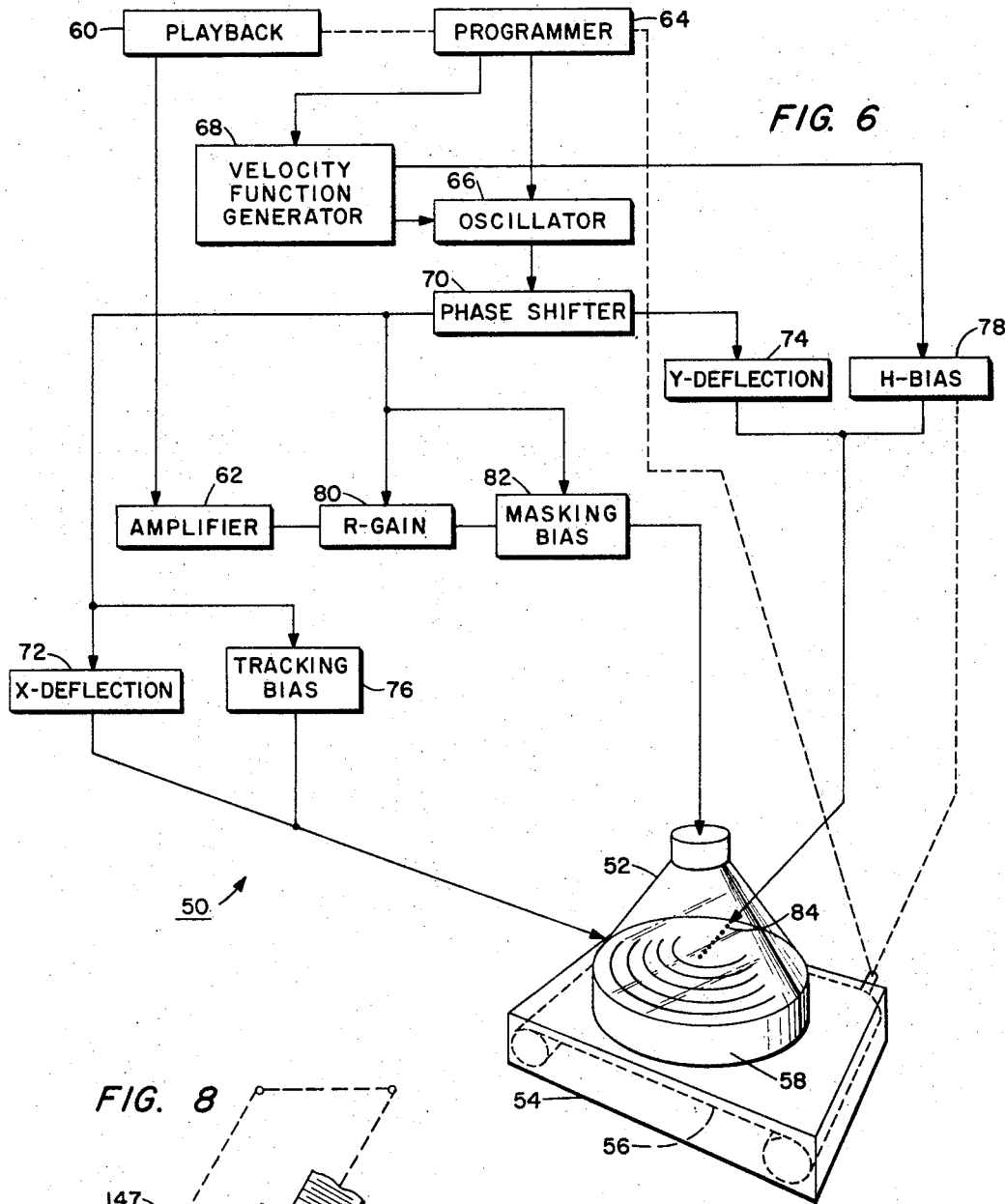
FIGURE 6 is a schematic drawing of a system constructed in accordance with the present invention.

Referring now to FIGURE 6, a system constructed in accordance with the present invention is indicated generally by the reference numeral 50. In the system 50, the sets of seismic response data are successively converted to data representative of scalar wave-front patterns by means of a cathode ray tube 52 and are summed on a continuous roll of film 56 in a camera 54. An optical system 58 may be used to focus the pattern appearing on the face of the cathode ray tube 52 on the film. The scanning electron beam is modulated in accordance with the seismic response data and is swept through a series of expanding arcuate paths in accordance with the velocity function of the seismic energy. The film 56 may be either moved continuously in synchronism with a displacement of the image on the tube or may be indexed at the scaled positions as will hereafter be described in greater detail.

The corrected seismic response data may be reproduced from magnetic records by a suitable playback system 60 and fed to the amplifier 62. The operation of the playback system 60 is synchronized by a programming circuit 64 which also controls a sine wave oscillator 66. The amplitude of the signal from the oscillator 66 is controlled by a velocity function generator 68 so that the rate at which the amplitude of the sine wave increases is related to the instantaneous velocity of the seismic energy. The output from the oscillator 66 is applied to a phase shifter 70 which produces two sine wave signals 90° out-of-phase. The two sine waves from the phase shifter 70 are applied to an X-deflection circuit 72 and a Y-deflection circuit 74 which are connected to drive the conventional X- and Y-deflection yokes of the cathode ray tube 52.

An H-bias circuit 78 is controlled by the velocity function generator 68 and adds a D.C. bias to the Y-deflection signal to move the apparent center of the circular scan of the beam downwardly as will presently be described. If the film 56 is to be moved continuously, a tracking bias circuit 76 is used to apply a D.C. bias to the X-deflection sine wave signal so as to cause the pattern on the face of the tube 52 to move in synchronism with the film 56. However, if the film 56 is to be indexed at successive scalar positions, the tracking bias circuit 76 may be eliminated. The output from the amplifier 62 is applied to an R-gain circuit 80, the gain of which is related to the amplitude of the sine wave deflection signal so as to maintain a spot of uniform intensity as the electron beam moves outwardly from the center and sweeps at a greater rate. The output from the R-gain circuit is applied to a masking bias circuit 82 which extinguishes the electron beam during at least the top half of the circular sweep. The output from the masking bias circuit 82 is then applied to the tube 52 to modulate the intensity of the electron beam.

As is well-known in the art, if two sine waves 90° out-of-phase are used to drive the X-deflection and Y-deflection means of a cathode ray tube, the electron beam will describe a circle on the face of the tube. The diameter of the circle in the X direction will be equal to the peak-to-peak amplitude of the X-deflection signal, and the diameter in the Y direction will be equal to the peak-to-peak amplitude of the Y-deflection sine wave. The center of the circle in the X and Y directions is determined by the D.C. level of the midpoint of the respective sine wave deflection signals.

In order to produce a scaled wave-front pattern having a distance scale from seismic response data recorded as a function of travel time, the following must be accomplished. It is desirable to have the apparent center 84 of the wave-front centered adjacent the top of the face of the cathode ray tube 52. This is accomplished either by raising or lowering, depending upon the polarity of the tube, the D.C. level of the Y-deflection sine wave voltage. For purposes of discussion it will be convenient to consider a high initial D.C. voltage level for the Y-deflection sine wave. At the beginning of a cycle, the apparent center 84 will be positioned on the datum plane to which the seismic response data has been corrected.

At the start of the playback of a set of seismic response data, the programmer 64 initiates the cycle of the velocity function generator 68 which initiates the output from the oscillator 66. The amplitude of the sine wave signal from the oscillator 66 is varied by the velocity function signal from the generator 68. The amplitudes of both the X and Y sine wave deflection signals increase at a rate related to the instantaneous velocity of the seismic energy at the particular elapsed time, so that the radius R of the arcuate paths may be expressed at any point in time by Equation 2. As the peak-to-peak amplitudes of the sine wave deflection voltages increase, the arcuate path scribed by the electron beam of the tube increases in diameter at a corresponding rate and appears to propagate from the center. The upper half of the circular path is masked out so that it will not interfere with the lower half as the apparent center is lowered, as will presently be described.

In one embodiment, the scanning electron beam moves in a circle at 2000 cycles per second, and the rate at which the radius R of the arcuate path increases is in real time, i.e., is one-half as fast as the rate at which the seismic energy propagates into the earth due to the two-way travel time of the seismic data, and therefore requires only a few seconds to plot each scalar wave-front pattern. If desired, the rate may be faster or slower by appropriate changes in the seismic signal.

The apparent center 84 of the arcuate paths representative of the energy wave-front is moved below the reference point by the distance H as expressed in Equation 1. It will be noted that the instantaneous acceleration $a$ is the only variable in Equation 1. Therefore the H-bias circuit 78 is operated by a signal from the velocity function generator 68 which is representative of the acceleration of the seismic energy or change in the velocity and applies a D.C. bias to the Y-deflection signal of a polarity to move the apparent center of the wave-front downwardly as a function of $a$ with respect to time. The acceleration $a$ may be a constant, or may be any desired function of time.

At this time it should be noted that the system has been described as utilizing seismic response data recorded with respect to travel time, rather than response data corrected to a uniform distance scale. If the seismic response data corrected to a uniform depth scale is used, the velocity function and acceleration function should be functions of depth so that accurate R and H values can be obtained.

As the electron beam travels through paths of progressively increasing radii, its speed relative to the face of the tube increases so that a beam of equal electron intensity would produce an illuminated area of less light intensity because of the increased writing rate. Therefore the intensity of the electron beam is increased by means of the R-gain circuit 80 as the radius of the path of the beam increases. Further, since only the lower half of the circle traced by the beam is to be used for plotting the scaled wave-front pattern, at least the upper half of the circle should be masked out. This is particularly important as the apparent center 84 descends so as to prevent interference of the top half of the circle with the small radius arcs previously plotted. The masking bias circuit 82 is provided to extinguish the electron beam at least during one-half of the Y-deflection signal. If desired, a masking bias may be used to extinguish the electron beam during a greater portion of the circular path so as to control the dip range of the system. For example, the electron beam may be extinguished except in the area bounded by the dotted lines 86 and 88 in FIGURE 5.

As previously mentioned, the film 56 may be moved at a constant rate past the face of the cathode ray tube 52. The scaled wave-front pattern on the face of the tube is made to follow the film by means of the tracking bias circuit 76. The circuit 76 adds progressively increasing D.C. bias voltage to the X-deflection signal which is synchronized to start with the beginning of each seismic response and increases at a rate governed by the travel of the film 56. The speed of the film is then selected such that at the start of each set of seismic response data, the center of the tube is opposite the appropriate scale position X of the particular response data. However if desired, the film 56 may be indexed to the scale position X after each scaled wave-front pattern is produced by the cathode ray tube. In such a case, the tracking bias circuit 76 would be replaced by a suitable indexing means (not illustrated).

Figure 7:
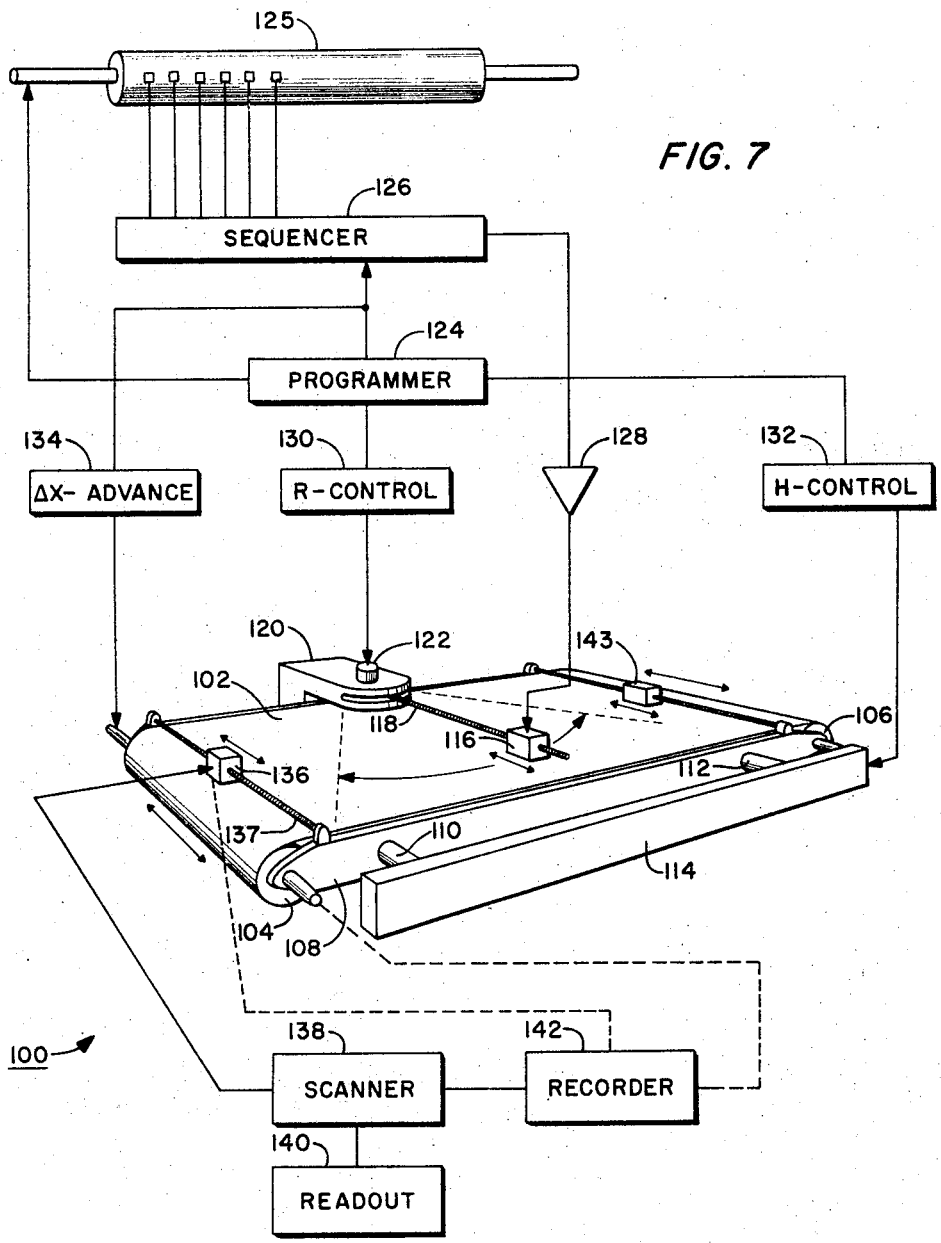
FIGURE 7 is a schematic drawing of another system constructed in accordance with the present invention.

Referring now to FIGURE 7, another system constructed in accordance with the present invention is indicated generally by the reference numeral 100. The system 100 is similar to the system 50 except that the recording transducer is a magnetic recording head which is mechanically scanned through the arcuate paths relative to a magnetic recording surface. A continuous magnetic record belt 102 is carried on rollers 104 and 106 which are journaled on a table 108 for movement in the horizontal X direction. The table 108 is mounted for movement transversely of the belt 102 to provide the variation in H by a suitable means such as threaded shafts 110 and 112. The shafts 110 and 112 may be driven by a suitable mechanism represented at 114.

A magnetic recording head 116 is disposed adjacent to the surface of the magnetic recording belt 102 and moves longitudinally of an arm 118. The arm 118 is oscillated through a predetermined arc from a pivotal support 120 at a constant rate by a suitable mechanism housed in the support 120. The head 116 is driven longitudinally of the arm 118 by a separate mechanism 122 so that the rate at which the head is moved can be selectively varied in accordance with the R value.

A series of seismic response signals recorded on adjacent channels of a magnetic recording drum 125 may be sequentially reproduced as a result of a sequencer circuit 126 and programming circuit 124. The reproduced response data is applied to an amplifier 128 which drives the magnetic recording head 116. The programmer 124 also synchronizes operation of an R-control circuit 130 which drives the mechanism 122 at a variable rate so as to move the recording head 116 outwardly along the arm 118 so that the distance from the head 116 to the center of oscillation of the arm is related to the value R. The programmer 124 similarly synchronizes operation of an H-control circuit 132 with the beginning of the reproduction of each seismic response signal. The H-control circuit 132 controls the mechanism 114 in such a manner as to move the entire table 108, and therefore the recording belt 102, toward the support 120. The rate of movement of the table 108 is such as to introduce the H factor into the wave-front pattern.

After each seismic response trace has been reproduced, the programming circuit 124 commences operation of the X advance control circuit 134 so as to move the magnetic belt 102 from right to left by a distance corresponding to the horizontal distance X between the points at which the successive sets of reflection data were recorded. A scanning pickup head 136 is positioned adjacent the surface of the magnetic belt 102 and is moved transversely of the belt, i.e., in the vertical scalar direction, by a suitable mechanism represented by the threaded rod 137. The scanning pickup head 136 is moved only during movement of the belt 102 between recording positions as will hereafter be described in greater detail, and the belt 102 may be moved continuously or may be indexed as desired. The output from the pickup head 136 is fed to an amplifier 138 which drives a suitable readout device 140 and a recorder 142. The readout device 140 may comprise an oscilloscope or similar device. The recorder 142 may comprise any suitable conventional device, such as one having a recording transducer which is moved in synchronism with the pickup head 136 relative to a record sheet moved in synchronism with the record sheet 102. A suitable erasing head 143 is provided to erase magnetic signals previously recorded on the belt in a conventional manner.

In the operation of the system 100, the seismic response data is sequentially reproduced, amplified and applied to the recording head 116. At the beginning of the playback of the seismic response signal, the recording head 116 is at zero position and the arm 118 is oscillated through a predetermined arc at a constant, relatively fast rate. The magnetic belt 102 is stationary with respect to the table 108. The table 108 is positioned adjacent the mechanism 114 so that the pivotal point of the oscillating arm 118 will be positioned on a datum line. As the seismic response data is reproduced and the arm 118 oscillated, the recording head 116 is moved along the arm 118 at a rate related to the instantaneous velocity of seismic energy through the earth at the corresponding elapsed time by Equation 2. At the same time, the mechanism 114 responds to the H-control circuit 132 and moves the entire table 108 and therefore the magnetic belt 102 toward the support 120 so that the center of oscillation of the arm 118, and therefore the apparent center of the wave front, is moved downwardly from the datum line in accordance with Equation 1. After the recording head 116 has moved to the end of the arm 118, at which time the seismic response trace will have been completely reproduced, the recording head returns to its position adjacent to the pivot point of the arm 118 and the table 108 returns to its position adjacent the mechanism 114, and the magnetic belt 102 is moved from right to left in FIGURE 7 by a distance corresponding to the distance between the points representative of the successive seismic response traces.

As the record belt 102 is moved to the new position, the scanning pickup head 136 scans the belt 102 in the vertical scale direction and the magnetic pattern impressed on the magnetic record belt 102 is reproduced and recorded by the recorder 142. After the magnetic belt 102 has moved the required distance, it is stopped and the next successive seismic response trace is reproduced and recorded as a wave-front pattern on the magnetic belt 102. The second and all subsequent scaled wave-front patterns are superimposed in scale position over the preceding wave-front patterns so that a composite magnetic pattern representative of a summation of the corresponding spatial points of the wave-front patterns is produced. The scaled wave-front patterns produced in this manner will be substantially the same in geometric configuration as the wave-front patterns produced by the system 50. The summation of the overlapping wave-front patterns will tend to be algebraic rather than mere summation as in the case of the system 50, although a linear summation cannot be easily achieved using the magnetic system.

Figure 8:
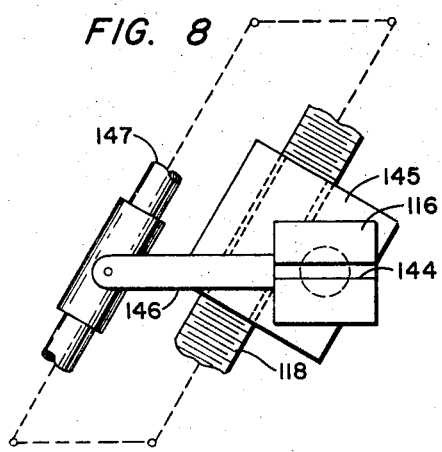
FIGURE 8 is an enlarged schematic drawing of a recording means which may be used in the system of FIGURE 7.

In accordance with other aspects of the invention, the recording head 116 is preferably maintained in a predetermined constant orientation with respect to the vertical scale direction on the belt 102 to facilitate compositing of the data from overlapping wave-front patterns. For example, in FIGURE 8, the air gap 144 of the recording head 116 may be maintained in horizontal scale position if pivotally connected to the carriage 145 which is moved along the oscillating arm 118. The head 116 may be maintained in this predetermined position by any suitable conventional means, such as by a gyroscope (not illustrated) or by an arm 146 fixed to the head 116 and slidingly coupled to a second arm 147 by a sleeve. The arm 147 is maintained parallel to the arm 118 by a parallelogram-type system illustrated in dotted line. By maintaining the recording head 116 oriented in one direction, a more linear and more accurate summation of the overlapping wave-front patterns may be obtained.

Figure 13:
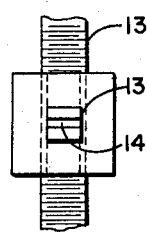
FIGURE 13 is a schematic drawing of a scanning pickup head which may be used in the system of FIGURE 7.
Figure 14:
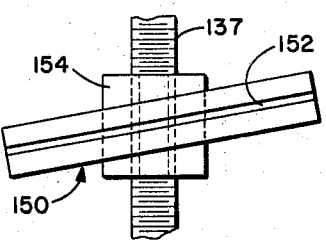
FIGURE 14 is a schematic view of another scanning pickup head which may be used in the system of FIGURE 7.

With the gap of the recording head 116 oriented in the horizontal direction, the gap of the pickup head 136 would also be oriented generally horizontally as illustrated in FIGURE 13. In most cases the dip of the various strata in a particular locality will be known or can be generally ascertained from a preliminary inspection of the data. In such a case it may be desirable to preferentially detect the magnetic reinforcement patterns lying along the tangents to the arcuate wave-fronts by using an elongated pickup head 150 such as illustrated in FIGURE 14 having an air gap 152 which may be aligned with the anticipated dip. The pickup head 150 may be connected to the support 154 which receives the threaded rod 137 by an adjustable means so that any desired dip may be selected.

Figure 15:
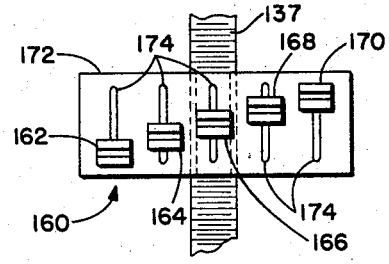
FIGURE 15 is a schematic drawing of still another scanning pickup head which may be used in the system of FIGURE 7; and, FIGURE 16 is a schematic illustration of still another system constructed in accordance with the present invention.

An alternative construction for a preferential dip pickup head 150 is indicated generally by the reference numeral 160 in FIGURE 15. In this embodiment, a series of magnetic pickup heads 162, 164, 166, 168 and 170 are positioned with the air gaps disposed parallel to the air gap 144 of the recording head 116. The heads are adjustably connected to a support 172 which travels along the threaded rod 137 by means of a series of slots 174 through which threaded bolts (not illustrated), connected to the respective heads, pass. The bolts may then be secured in place by thumbscrews (not illustrated) or other suitable means so that the heads may be positioned in any desired alignment corresponding to the dip which is to be preferentially detected. The outputs of the several heads are mixed so that samplings will be taken along the preferred dip angle and composited to increase the sensitivity to reinforcement patterns lying at the selected dip angle and decrease random noise. If desired, a sufficient number of heads may be used so that only one scan of the pickup head is required for each spacing between successive recordations of the sets of response data.

As illustrated in FIGURE 7, the arm 118 merely oscillates through the entire dip range. The arm 118 must be oscillated at a high rate with respect to movement of the recording head 116 along the arm in order to obtain the desired resolution. The system can be operated at less than real time if the seismic data is slowed. If desired, two or more arms may be fixed in angular relationship and oscillated to reduce the speed of the heads and relax the acceleration requirements. It will also be evident that one or more arms 118 could be rotated through a full 360° with the respective heads 116 energized only during the desired segment of travel of the arm as in the case of the electron beam in the system 50.

Figure 9:
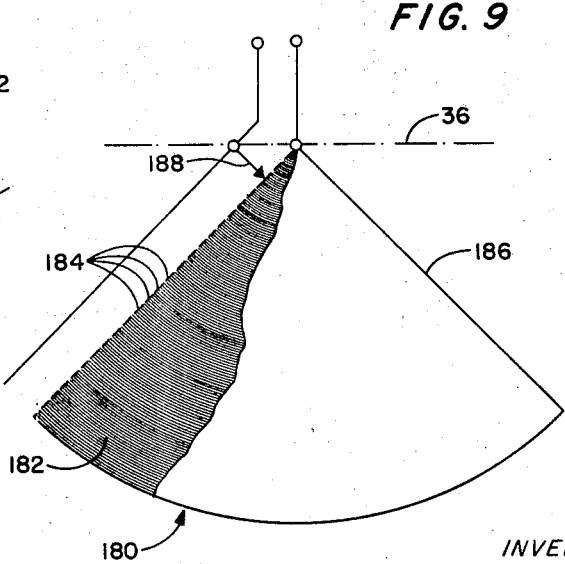
FIGURE 9 is a schematic drawing of an alternative recording means which may be used in the system illustrated in FIGURE 7.

Referring now to FIGURE 9, an alternative magnetic recording head for producing scaled wave-front patterns is indicated generally by the reference numeral 180. The recording head 180 may replace the recording head 116 and oscillating arm 118 in the system 100. The recording head 180 has a large number of concentric arcuate magnetic recording segments 182, each of which is connected between a contact 184 and a common ground 186 so that the arcuate segments may be sequentially energized by a sliding contact 188 moved along the contacts 184. A suitable mechanism (not illustrated) such as a threaded rod is provided to move the sliding contact 188 outward so that its distance from the center of the arcuate segments 182 is always representative of R in Equation 2.

Figure 11:
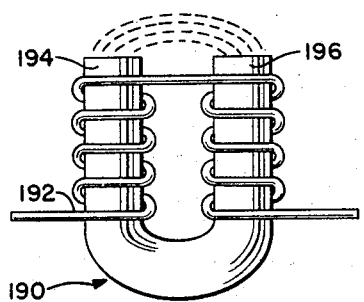
FIGURE 11 is an enlarged schematic view of a magnetic recording element of the recording means of FIGURE 9.

Each of the arcuate recording segments 182 may be comprised of a series of small electromagnets 190 of the type illustrated in FIGURE 11. A single conductor 192 is wound around the cores of all of the electromagnets 190 in a segment in a conventional manner, such as illustrated in FIGURE 11, and extends from the contact 184 to the ground 186. The poles 194 and 196 of each core are preferably oriented in the vertical scale direction so that the resulting magnetization of the record belt 102 can be detected by the recording head 136.

The operation of the system 100 using the recording head 180 is identical to that previously described except that the entire arcuate wave-front under each segment 182 is instantaneously magnetized as the sliding contact 188 moves along the row of contacts 184. Thus the peak value of the seismic response trace during the period of time while the contact 188 completes an electrical circuit to the contact 184 will be impressed in an arcuate pattern on the magnetic belt 102. Although the radii of the arcuate recording segments are fixed, the true curved path of the seismic energy wave-front is plotted by reason of the controlled movement of the sliding contact 188 to obtain the proper R value and the controlled movement of the table 108 to obtain the proper H value. The head 180 is more simplified, from an operational standpoint, than the recording head 116 but good resolution is more difficult because of the size of the electromagnets 190.

Figure 12:
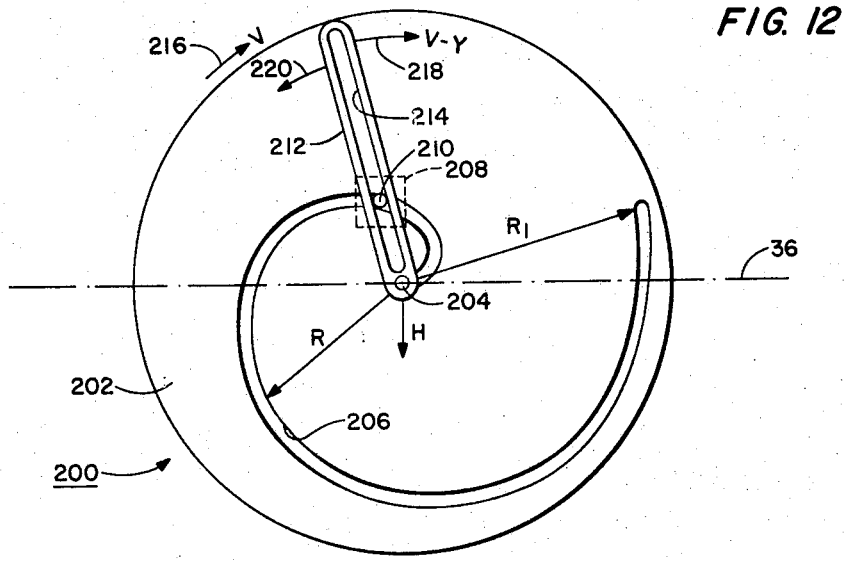
FIGURE 12 is a schematic view of another recording means which may be used in the system of FIGURE 7.
Figure 10:
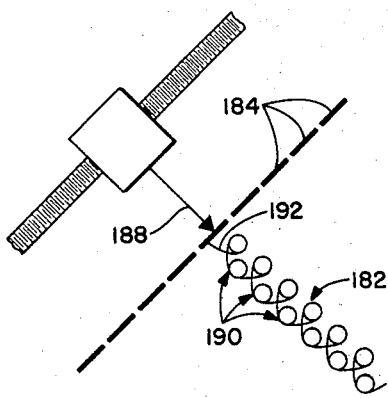
FIGURE 10 is an enlarged schematic view of a portion of the recording means of FIGURE 9.

Another recording head which may be used in the system 100 in lieu of the recording head 116 and arm 118 is indicated generally by the reference numeral 200 in FIGURE 12. A disc 202 is rotated at a constant rate about a center 204 and has a spiral slot 206 extending from the center to a maximum radius $R_1$. The rate at which the radius R of the spiral slot 206 changes with respect to an angular coordinate is varied in accordance with the instantaneous velocity of the seismic energy through the earth section of interest. A recording head 208 which may have an air gap oriented in predetermined constant relationship to the datum plane 36 which initially passes through the center 204 may be guided along the slot 206 by a pin 210 which rides in the groove. An arm 212 has a slot 214 which also receives the pin 210. The arm 212 rotates in the same direction about the point 204 at a slightly slower speed than the disc 202. Thus as the disc 202 rotates in the clockwise direction, indicated by the arrow 216, at a velocity V, and as the arm 212 rotates in the same direction, represented by the arrow 218, at a velocity V-Y, the arm 212 will have a velocity Y relative to the disc 202 in the counterclockwise direction of the arrow 219. The resulting relative movement Y moves the recording head 208 along the spiral slot 206 such that the rate at which the radius R increases will be determined by the curvature of the slot 206. Thus by making the curvature of the slot represent the velocity function, the radius R can be controlled as heretofore described. The table 108 can then be moved relative to the rotating disc in order to produce the necessary H variation as previously described.

Figure 16:
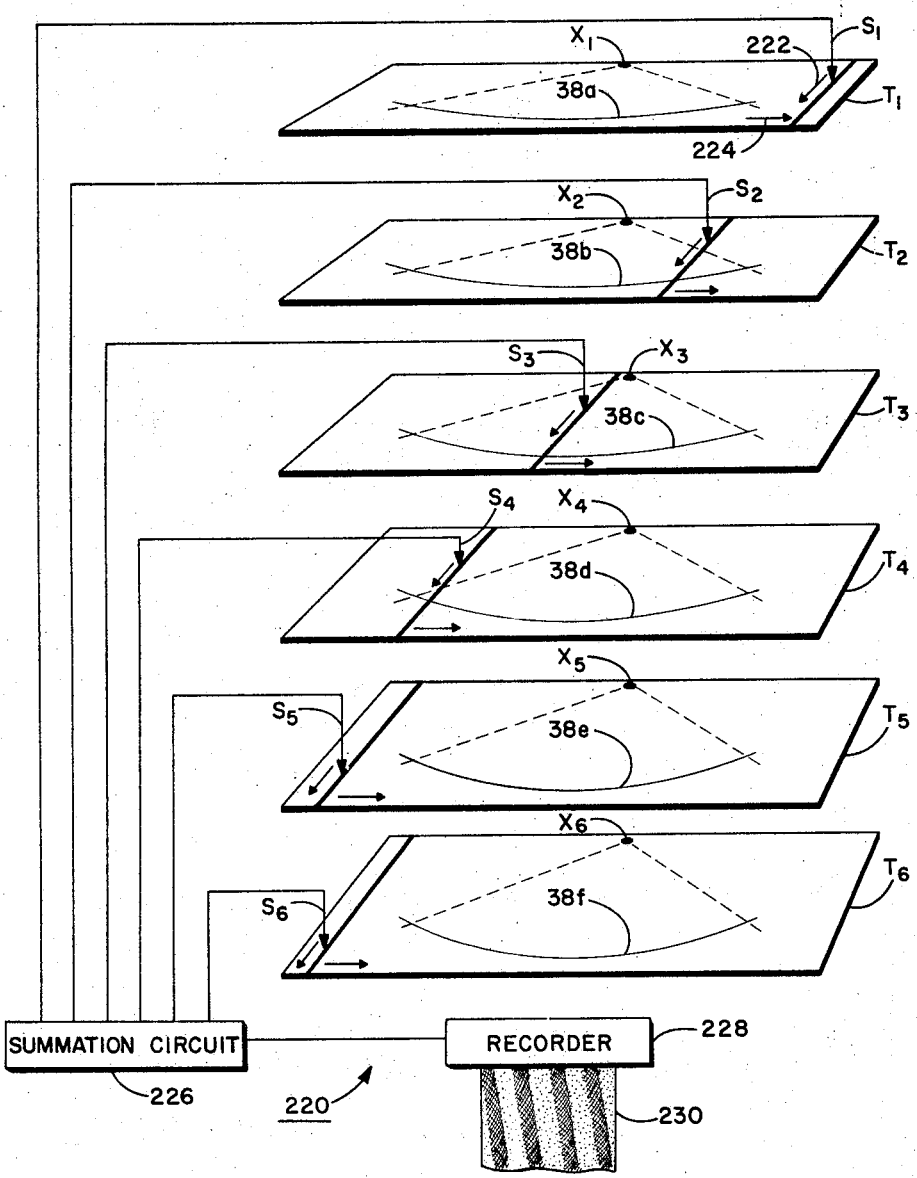

Referring now to FIGURE 16, still another embodiment of the invention is indicated generally by the reference numeral 220. The system 220 may be used to accomplish algebraic summation of the several seismic wave-front patterns as will presently be described. The system 220 utilizes a plurality of separate storage means $T_1$ through $T_6$. The storage means $T_1$–$T_6$ may be any suitable record surface upon which the scaled wave-front patterns may be impressed and retained and subsequently read out by point-to-point scanning. For example, each of the storage means $T_1$–$T_6$ may comprise a magnetic recording medium. In such a case, a suitable means such as the recording head 116 and arm 118, or the recording head 180, would be used to produce the scalar wave-front patterns on each recording means. Alternatively, each of the storage means $T_1$–$T_6$ may comprise a conventional cathode ray storage tube which stores electrical charges on a screen within the tube by means of a scanning beam. The recording electron beam of each tube would be controlled as described in the system 50 to record the scalar wave-front patterns. The stored charges can be read out by the same or another scanning beam. Or each of the storage means $T_1$–$T_6$ may comprise a permanent storage means such as in a xerographic or photographic system in which the wave-front patterns may be formed by a scanned and modulated light source, then subsequently read out by an appropriate transducer as will presently be described. Separate scaled wave-front patterns having initial apparent centers $X_1$–$X_6$ are stored on the storage means $T_1$–$T_6$, respectively. The wave-front patterns might be produced from the corrected seismic response signals 38a–38f which are spaced along the horizontal datum line by a distance $\Delta X$.

Separate scanning pickup transducers $S_1$ through $S_6$ are synchronously operated so as to scan corresponding coordinate scale positions on the respective scaled wave-front patterns. For example, assuming that the storage means $T_1$–$T_6$ are magnetic record sheets, the scanning transducers $S_1$–$S_6$ would be magnetic pickup heads. The scanning transducers $S_1$–$S_6$ are moved in synchronism over corresponding coordinate positions of the respective scalar wave-front patterns. For example, assume that scaled wave-front patterns representative of the seismic response signals 38a–38f are recorded on the storage means $T_1$–$T_6$, respectively, with the original apparent wave-front centers at $X_1$–$X_6$, respectively. As illustrated in FIGURE 16, the scanning transducers $S_1$–$S_5$ are at an intermediate position as will presently be described. Each of the scanning transducers $S_1$–$S_6$ would initially be positioned at the left-hand edge of the respective storage means $T_1$–$T_6$ with the scanning head positioned at the datum plane represented by the initial centers $X_1$–$X_6$. The scanning transducer $S_1$ would then be scanned vertically in the direction of the dotted arrows 222. After each vertical sweep, the scanning transducer would then be indexed in the horizontal direction as indicated by the dotted arrow 224. If desired, the scanning transducers $S_1$–$S_6$ may be scanned at a continuous fast rate in the vertical direction and a relatively slow rate in the horizontal direction. After the scanning transducer $S_1$ has moved in the horizontal scale direction by a scaled distance representative of the horizontal distance $\Delta X$ between the signals 38a and 38b, the scanning transducer $S_2$ begins to scan the storage means $T_2$ in vertical and horizontal synchronism so that the common coordinate positions of the scaled wave-front patterns will be simultaneously scanned and converted to a signal representative of the value of each pattern at that point. After the scanning transducers have moved a scaled distance representative of $\Delta X$ between the response data signals 38b and 38c, the scanning transducer $S_3$ begins to scan the storage means $T_3$ in vertical and horizontal synchronism with scanning transducers $S_1$ and $S_2$. Scanning transducers $S_4$, $S_5$ and $S_6$ follow in similar fashion.

A sufficient number of storage means T are provided so that not all of the scanning transducers will commence to operate prior to the time the first scanning transducer $S_1$ has completed scanning the storage means $T_1$. This permits a period of time during which the next successive scaled wave-front pattern, such as the pattern from response signal 38g, can be recorded on the storage means $T_1$. Then after the last scanning transducer $S_6$ has moved a scale distance representative of the scale distance between the response signals 38f and 38g, the first scanning transducer $S_1$ begins to scan in synchronism with the other sacnning transducers. In this manner a continuous composite pattern can be produced from any number of sets of seismic response data. The outputs from the scanning transducers $S_1$–$S_6$ are fed to a summation circuit 226 where the signals are summed, preferably algebraically. The summation signal is then applied to a recorder 228 which is operated in synchronism with the horizontal and vertical movement of the scanning transducers $S_1$–$S_6$ so as to produce a visible record 230 of the interference patterns. If desired, the summation signal may merely be recorded magnetically or in any other desired manner. If desired, the scanning transducers $S_1$–$S_6$ can be indexed in synchronism in the vertical scale direction and scanned in synchronism in the necessary relative horizontal positions to simultaneously scan corresponding scale positions. By corresponding scale positions, it is meant those positions which would coincide if all the scaled wave-front patterns were placed in scale positions on a single surface.

From the above described embodiments of the method and system of the present invention, it will be evident to those skilled in the art that the method of the invention may be carried out on a digital computer. The computer may be programmed in any conventional manner by which the first set of seismic response data may be converted to digital data representative of the respective scaled wave-front patterns. This data is then stored in a coordinate manner and subsequent sets of seismic response data converted to data representative of scaled wave-front patterns. The corresponding coordinate digital values of all the wave-front patterns are then summed to produce coordinate digital data representative of the summation of the several wave-front patterns when the patterns are oriented in scale positions relative to a datum line.

From the above detailed description of several preferred embodiments of the invention, it will be evident that a highly useful method and system has been described for processing seismic response data. The seismic response data is automatically plotted in real time. All of the response data is plotted, rather than only selected portions, and the data may be very accurately located to the extent seismic velocity data is available. The inherent errors of manual plotting are substantially eliminated and the plotting time greatly decreased. The intermediate traces heretofore required to display the response data in such a manner that it could be interpreted and plotted are eliminated. Further the response data tends to be enhanced due to the compositing resulting from the reinforcement and attenuation of overlapping portions of the response data, and the compositing is accomplished in the migrated mode which has not heretofore been possible.

Although several preferred embodiments of the invention have been described in detail, it is to be understood that various changes, substitutions and alterations can be made therein without departing from the spirit and scope of the invention as defined by the appended claims.

What is claimed is:

1. The method for locating subsurface acoustic velocity discontinuities from a plurality of acoustic response signals each representative of the amplitude of acoustic energy received at a detection point and induced at a source point which comprises:
    converting each of the response signals to data representative of a scaled wave-front pattern, each of the coordinate points of each scaled wave-front pattern having a value representative of the amplitude of the respective acoustic response signal at the point in time on the response signal that is equal to the acoustic travel time from the respective source point to the coordinate point and back to the respective detection point, and
    combining the data representative of the scaled wave-front patterns to produce data representative of the sums of the amplitude values of the common coordinate points of the wave-front patterns if the patterns were superimposed in relative scale positions whereby the combined data will be representative of a composite pattern having reinforcement patterns representative of the scale positions of the acoustic velocity discontinuities.

2. The method defined in claim 1 wherein:
    the data is combined by algebraically summing the values of the data at the common coordinate points.

3. The method defined in claim 1 wherein:
    the data is combined by adding the values of the data at the common coordinate points.

4. The method defined in claim 1 wherein:
    each scaled wave-front pattern is comprised of a series of arcuate wave-fronts each representative of the position of the seismic energy wave-front at elapsed time $t$, each arcuate wave-front having a scaled radius $R_t$ and an apparent center disposed a scaled distance $H_t$ below a datum line with $$R_t = \frac{V_d}{a}\left(\sinh\frac{at}{2}\right)$$

and $$H_t = \frac{V_d}{a}\left(\cosh\frac{at}{2} - 1\right)$$

wherein $V_d$ is the velocity of seismic energy at the datum line and $a$ is the instantaneous acceleration of the seismic energy at elapsed time $t$, and
    each wave-front has a value representative of the value of the seismic response data at elapsed time $t$.

5. The method defined in claim 4 wherein $a$ is equal to zero.

6. The method defined in claim 4 wherein $a$ is a constant.

7. The method defined in claim 4 wherein $a$ is a function of the elapsed time.

8. The method defined in claim 1 wherein each of the response signals is converted to data representative of a scaled wave-front pattern by:
    recording the seismic response data with respect to elapsed time $t$ on a record surface by sweeping a recording transducer through a series of arcuate paths having a scaled radius $R_t$ and an apparent center spaced a distance $H_t$ below a scaled datum line with $$R_t = \frac{V_d}{a}\left(\sinh\frac{at}{2}\right)$$

and $$H_t = \frac{V_d}{a}\left(\cosh\frac{at}{2} - 1\right)$$

wherein $V_d$ is the velocity of seismic energy at the datum line and $a$ is the instantaneous acceleration of seismic energy at elapsed time $t$.

9. The method defined in claim 8 wherein the transducer is a beam of energy.

10. The method defined in claim 1 wherein the data is combined by:
    recording the data representative of the scaled wave-front patterns in relative scale positions on a common recording surface so that the overlapping portions tend to reinforce along common tangent lines to produce the composite pattern.

11. The method defined in claim 1 wherein the data is combined by:
    recording the data representative of each scaled wave-front pattern in scaled position on a record surface,
    synchronously scanning the common portions of each of the recorded scaled wave-front patterns and producing a signal representative of the value of the scanned portion of each scaled wave-front pattern, and
    summing the signals to produce the data representative of the composite patterns.

12. The method defined in claim 11 wherein the data is magnetically recorded on a magnetic record surface, and is scanned with a magnetic pickup.

13. The method defined in claim 11 wherein the data is photographically recorded and is scanned with a photoelectric pickup to produce the signal.

14. The method defined in claim 11 wherein the data is recorded as a capacitive charge and scanned with a capacitance detector to produce the signal.

15. The method defined in claim 11 wherein the data is recorded by an electron beam as a capacitive charge and scanned by an electron beam to produce the signal.

16. A system for plotting a series of acoustic response signals each having an amplitude with respect to time and resulting from acoustic energy generated at a source point and received at a detection point comprising:

means for reproducing each of the seismic response signals as a scaled wave-front pattern having coordinate values, each coordinate value being representative of the amplitude of the response signal at the point in time corresponding to the time required for the energy to travel from the respective source point to the point represented by the coordinate point and return to the respective detection point, and means for summing the common coordinate values of the scaled wave-front patterns if the patterns were disposed in relative scale position to produce a composite pattern, whereby the composite pattern will have reinforcement patterns representative of velocity discontinuities producing the acoustic response.

17. The system defined in claim 16 wherein the means for reproducing each of the acoustic response signals as a scaled wave-front pattern comprises:

means for producing each response signal as an amplitude modulated signal, a recording transducer for recording the amplitude modulated signal on a record surface, a record surface having a datum line, and means for repeatedly sweeping the transducer over the record surface at a relatively high rate to record the amplitude modulated signal on the surface, the transducer being swept through an arcuate path having a relatively slowly increasing radius $R_t$ at time $t$ and a center disposed a distance $H_t$ below the datum line at time $t$ where $$R_t = \frac{V_d}{a}\left(\sinh \frac{at}{2}\right)$$

and $$H_t = \frac{V_d}{a}\left(\cosh \frac{at}{2} - 1\right)$$

and $V_d$ is the velocity of acoustic energy through the earth at the datum plane and $a$ is the instantaneous acceleration of the acoustic energy at time $t$.

18. The system defined in claim 17 wherein the recording transducer is the modulated beam and the record surface is the display face of a cathode ray tube.

19. The system defined in claim 17 wherein the recording transducer is the modulated beam and the record surface is the storage grid of a cathode ray storage tube.

20. The system defined in claim 17 wherein the recording transducer is a magnetic recording head, and the record surface is a magnetic record sheet.

21. The system defined in claim 20 wherein the recording transducer is a modulated light beam and the record surface is a photographic film.

22. The system defined in claim 16 wherein the means for summing corresponding coordinate values comprises:

a record sheet having a datum line upon which the several scaled wave-front patterns are superimposed in scale position relative to the datum line.

23. The system defined in claim 22 wherein the means for summing corresponding coordinate values comprises:

means for simultaneously scanning the corresponding coordinate positions of the scaled wave-front patterns and producing a signal representative of each, means for summing the signals to produce a second signal representative of the sum of the values of the coordinate positions of the scaled wave-front patterns, and means for recording the second signal at the respective coordinate positions on a record sheet to produce a composite pattern.

24. A system for plotting a series of seismic response signals recorded with respect to time and corrected to a common source and record point on a datum plane which comprises:

a cathode ray tube, means coupled to the tube for modulating the beam of the tube in accordance with a seismic response signal, means coupled to the tube for continually deflecting the beam along an arcuate path having a radius $R_t$ at an elapsed time $t$ after seismic energy first passed the datum plane while propagating downwardly where $$R_t = \frac{V_d}{a}\left(\sinh \frac{at}{2}\right)$$

and $V_d$ is the velocity of seismic energy at the datum plane and $a$ is the instantaneous acceleration of seismic energy at elapsed time $t$, and having a center disposed a distance $H_t$ below a datum line at time $t$ where $$H_t = \frac{V_d}{a}\left(\cosh \frac{at}{2} - 1\right)$$

for producing a scaled wave-front pattern on the face of the tube, and means for photographically recording successive scaled wave-front patterns on the face of the tube at successive scaled positions on a common film whereby the wave-front patterns will be summed to produce reinforced patterns representative of reflecting interfaces.

25. A system as defined in claim 24 wherein the means coupled to the tube for continually deflecting the beam comprises:

a sine wave oscillator, velocity function generating means coupled to the oscillator for controlling the amplitude of the sine wave in accordance with $R_t$, and phase shifting means coupled to the oscillator for shifting the sine wave into X-deflection and Y-deflection sine waves 90° out-of-phase and coupled to the tube for applying the sine waves to the deflection coils of the tube to sweep the beam through a circle.

26. A system as defined in claim 24 further characterized by:

means coupled to the tube for increasing the intensity of the beam in proportion to $R_t$.

27. A system for plotting a series of seismic response signals recorded with respect to time and corrected to a common source and record point on a datum plane which comprises:

means for sequentially producing the seismic response signals, a magnetic recording head coupled to the means for producing the seismic response signals for recording the signals on a magnetic record sheet, a magnetic record sheet, means for sweeping the magnetic recording head through a series of arcuate paths at a relatively high rate, the arcuate paths having a radius increasing at a relatively slow rate representative of the instantaneous velocity of seismic energy at the depth represented by the point in time of the seismic response signal, means for moving the record sheet relative to the means for sweeping the magnetic recording head in a vertical scale direction at a rate related to the acceleration of the seismic energy, with depth, and means for moving the record sheet relative to the means for sweeping the magnetic recording head in a horizontal scale direction so that successive seismic response signals may be recorded at successive horizontal scale positions.

28. The system defined in claim 27 further characterized by:

means for scanning the magnetic sheet and producing a signal representative of the composite magnetic pattern impressed on the record sheet.

29. The system defined in claim 28 wherein:
the record sheet is a continuous belt in the horizontal scale direction.

30. The system defined in claim 27 further characterized by:
means for maintaining the magnetic recording head oriented in predetermined relationship with respect to the record sheet as the recording head is moved relative to the record sheet such that the magnetic flux impressed on the magnetic record sheet will be oriented in a common direction.

31. A system for plotting a series of seismic response signals recorded with respect to time, and corrected to a common datum plane which comprises:
a magnetic record sheet,
means for sequentially producing the seismic response signals,
magnetic recording means coupled to the means for sequentially producing the seismic response signal for recording the seismic response signals as a scaled wave-front pattern on the magnetic record sheet having a series of arcuate recording segments and means for sequentially energizing the segments with the seismic response signal at a rate representative of the instantaneous velocity of seismic energy at the corresponding time,
means for moving the magnetic recording means relative to the magnetic record sheet in a vertical scale direction at a rate representative of the instantaneous acceleration of seismic energy at the corresponding time, and
means for moving the magnetic recording means relative to the magnetic record means in the horizontal scale direction whereby successive response signals may be recorded as scaled wave-front patterns at successive horizontal scale positions on the record sheet.

32. A system as defined in claim 31 further characterized by:
means for reproducing the wave-fronts pattern from the record sheet as a visible pattern.

33. A system for plotting a series of seismic response signals detected at horizontally-spaced points, recorded with respect to time, and corrected to a common datum plane which comprises:
a plurality of storage means for storing scaled wave-front patterns,
means for impressing a scaled wave-front pattern from a seismic response signal on each storage means,
means for scanning corresponding coordinate positions of the wave-front patterns impressed on the storage means and producing a signal representative of the value of each wave-front pattern at the scanned position, and
means for summing the produced signals to produce a second signal representative of a composite pattern of the wave-front patterns superimposed in relative scale positions.

34. A system as defined in claim 33 further characterized by:
means for recording the second signal as a visible composite pattern.

35. A system as defined in claim 33 wherein:
each of the storage means is a magnetic record sheet.

36. A system as defined in claim 33 wherein:
each of the storage means is the storage grid of a cathode ray storage tube.

37. A system as defined in claim 33 wherein each of the storage means is a photographic storage means.

38. A system for plotting a scaled wave-front pattern from an acoustic response signal which comprises:
a recording transducer,
means for applying the response signal to the recording transducer such that the recording transducer will record the signal amplitude,
a record sheet, and
means for sweeping the transducer over the record sheet through a series of arcuate paths representative of seismic wave fronts at a particular elapsed travel time whereby the amplitude value of the response signal at said point in time will be recorded as an arcuate wave-front on the record sheet.

39. The system defined in claim 38 wherein:
the recording transducer is the beam of a cathode ray tube which is continuously modulated by the response signal,
the record sheet is the face of the cathode ray tube, and
the means for sweeping the transducer comprises the deflection means of the cathode ray tube.

40. The system defined in claim 39 wherein:
the face of the cathode ray tube is luminescent to produce a visible wave-front pattern.

41. The system defined in claim 39 wherein:
the face of the cathode ray tube is a storage grid which may be read out by a scanning beam.

42. The system defined in claim 38 wherein:
the recording transducer is a magnetic recording head, and
the record sheet is a magnetic record sheet.

43. A system for plotting a scaled wave-front pattern from an acoustic response signal which comprises:
a record sheet,
a series of concentric arcuately-shaped recording transducers for recording a series of arcuate patterns on the record sheet, and
means for sequentially energizing the arcuately-shaped recording transducers at a rate representative of the instantaneous velocity of seismic energy with a signal representative of the amplitude of the acoustic response signal whereby the amplitude of the response signal will be recorded in an arcuate pattern on the record sheet.

44. The system defined in claim 43 wherein:
the record sheet is a magnetic record sheet, and
the recording transducers are magnetic recording means.

45. The system defined in claim 43 further characterized by:
means for moving the record sheet in the vertical scale direction relative to the arcuately-shaped recorded heads at a rate related to the instantaneous rate of acceleration of seismic energy.

46. The method for locating subsurface interfaces which comprises:
inducing seismic energy in the earth and recording the seismic response with respect to elapsed time at a plurality of points spaced along the surface to produce a plurality of records of seismic response data, each record being representative of the amplitude of the seismic response at one of said points,
correcting each record for normal move out to make each record representative of the seismic response at a reference point on a datum plane which would have been produced from seismic energy induced and received at the reference point,
converting each corrected record to data representative of a scaled wave-front pattern that is amplitude modulated in accordance with the seismic response data, and
combining the data representative of the sum of the wave-front patterns at each spatial point as if each pattern were centered at scale points along a datum line representative of the respective reference points on the datum plane,
whereby the combined data will be representative of a composite pattern having reinforcement patterns representative of the scale positions of the reflecting subsurface interfaces.

47. The method for locating subsurface velocity discontinuities from a plurality of seismic response records each representative of the seismic response received at a record point and induced at a source point which comprises:
  converting the data representative of the seismic response at each record point to data representative of a continuously modulated scaled wave-front pattern the coordinate points of which have a modulation value representative of the amplitude of the seismic response record at the point in time corresponding to the time required for the seismic energy to travel from the source point to the coordinate point and return to the record point, and
  summing the data at the coordinate points of the scaled wave-front patterns that would be common if the scaled wave-front patterns were partially superimposed in relative scale position to produce data representative of a composite pattern having reinforcement patterns representative of the scale positions of the velocity discontinuities.

48. The system for plotting an acoustic response signal detected at spaced points as a scaled, modulated wave-front pattern which comprises:
  a cathode ray tube,
  means coupled to the tube for modulating the beam of the tube in accordance with the acoustic response signal, and
  means for sweeping the modulated beam of the tube through arcs of progressively increasing radii to simulate the location of the wave-front at the corresponding point in time.

49. In a system for detecting reinforcement patterns in a composite record formed on a record sheet by superimposing a plurality of scaled wave-front patterns in relative scale positions, the combination of:
  a record sheet for recording the composite record,
  a pickup transducer, and
  means for scanning the pickup transducer relative to the record sheet in the vertical scale direction,
  the pickup transducer having an elongated area of sensitivity oriented at an angle to the vertical scale direction corresponding to the angle at which reinforcement patterns of interest in the composite record lie.

50. The system defined in claim 49 wherein:
  the record sheet is a magnetic record sheet, and
  the pickup transducer is a magnetic pickup head having an elongated flux gap for simultaneously detecting the magnetic flux recorded over an elongated portion of the record sheet and producing a signal representative of the total value of the magentic flux affecting the elongated flux gap.

References Cited
UNITED STATES PATENTS

| | | | |
|---|---|---|---|
| 2,914,854 | 12/1959 | Westphal | 340—15.5 X |
| 3,076,175 | 1/1963 | Skelton et al. | 340—15.5 |
| 3,127,585 | 3/1964 | Alexander et al. | 340—15.5 |
| 3,149,303 | 9/1964 | Klein et al. | 340—15.5 |
| 3,174,142 | 3/1965 | Mallinckrodt | 340—15.5 |

BENJAMIN A. BORCHELT, *Primary Examiner.*

R. M. SKOLNIK, *Assistant Examiner.*